United States Patent [19]

Matsuda et al.

[11] Patent Number: 5,369,439
[45] Date of Patent: Nov. 29, 1994

[54] ORTHOGONAL TRANSFORM ENCODER USING DC COMPONENT TO CONTROL QUANTIZATION STEP SIZE

[75] Inventors: Toyohiko Matsuda, Katano; Masakazu Nishino, Kashiwara; Shigeru Awamoto, Osaka, all of Japan

[73] Assignee: Matsushita Electric Industrial Co., Ltd., Kadoma, Japan

[21] Appl. No.: 955,829

[22] Filed: Oct. 2, 1992

[30] Foreign Application Priority Data

Oct. 2, 1991 [JP] Japan .................................. 3-255030
Oct. 23, 1991 [JP] Japan .................................. 3-275162

[51] Int. Cl.⁵ .......................................... H04N 7/133
[52] U.S. Cl. ..................................... 348/405; 348/395
[58] Field of Search ....................... 358/133, 135, 136; 348/419, 405, 391, 393, 395, 396; H04N 7/13, 7/133, 7/137

[56] References Cited

U.S. PATENT DOCUMENTS

| | | | |
|---|---|---|---|
| 4,580,162 | 4/1986 | Mori | 358/135 |
| 5,006,931 | 4/1991 | Shirota | 358/133 |
| 5,121,216 | 6/1992 | Chen et al. | |
| 5,196,933 | 3/1993 | Henot | 358/136 |

FOREIGN PATENT DOCUMENTS

| | | | |
|---|---|---|---|
| 0283715 | 9/1988 | European Pat. Off. | |
| 0296608 | 12/1988 | European Pat. Off. | |
| 0368139 | 5/1990 | European Pat. Off. | |
| 0427653 | 5/1991 | European Pat. Off. | H04N 7/13 |
| 0439675 | 8/1991 | European Pat. Off. | H04N 7/133 |
| 0500077 | 8/1992 | European Pat. Off. | H04N 7/133 |
| 0500306 | 8/1992 | European Pat. Off. | |
| 63-076687 | 4/1988 | Japan | |
| 1129589 | 5/1989 | Japan | H04N 7/137 |
| 2076385 | 3/1990 | Japan | |
| 3140074 | 6/1991 | Japan | |
| 3207190 | 9/1991 | Japan | |
| 3247189 | 11/1991 | Japan | H04N 7/133 |
| 47989 | 1/1992 | Japan | H04N 7/133 |
| 4177991 | 6/1992 | Japan | H04N 7/133 |

OTHER PUBLICATIONS

Y. S. Ho et al., "Classified Transform Coding of Images Using Vector Quantization", *ICASSP 89 Multi-Dimensional Signal Processing*, vol. 3, pp. 1890–1893 (May 23, 1989).

J. W. Kim et al., "Discrete Cosine Transform-Classified VQ Technique for Image Coding", *ICASSP 89 Multi-Dimensional Signal Procesing*, vol. 3, pp. 1831–1834 (May 23, 1989).

*Primary Examiner*—Tommy P. Chin
*Assistant Examiner*—Bryan S. Tung
*Attorney, Agent, or Firm*—Ratner & Prestia

[57] ABSTRACT

According to orthogonal transformation coefficients obtained through orthogonal transformation, the degree of influence on visual sensation is detected. Depending on the degree of influence on visual sensation, a quantization step size is controlled so as to assign a greater amount of codes to each block of which image quality deterioration is conspicuous and a smaller amount of codes to each block of which image quality deterioration is less conspicuous.

5 Claims, 11 Drawing Sheets

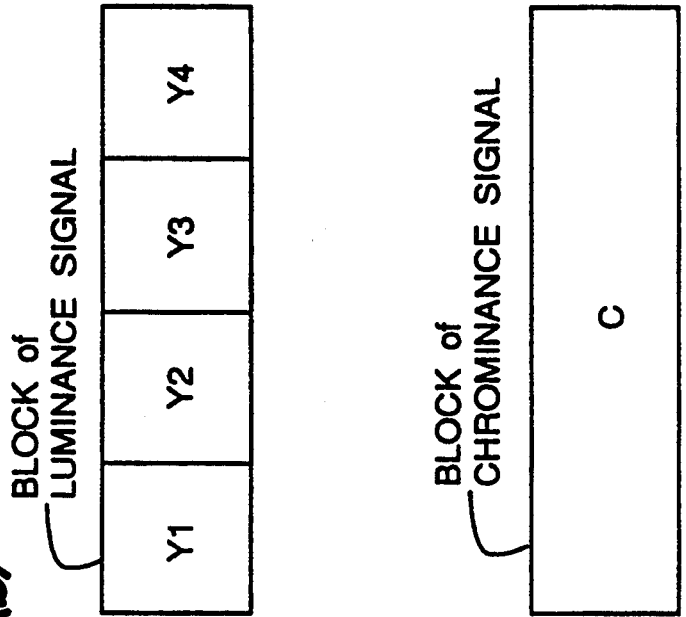
Fig.5(a) 4:2:0
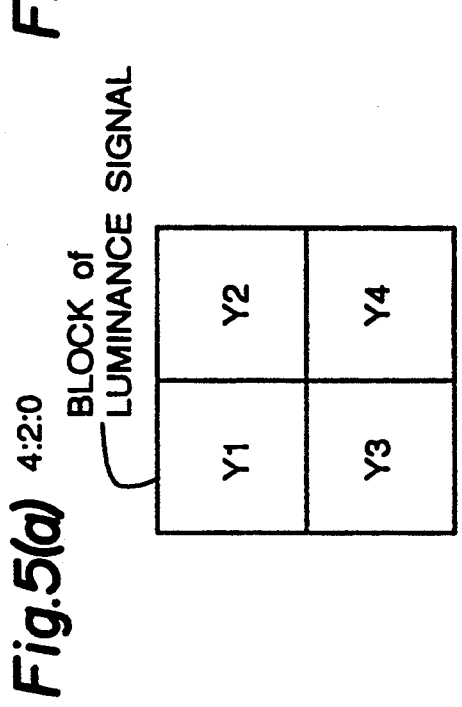
Fig.5(b) 4:1:1

Fig. 8

| L MAX / H MAX | 0 | 1 | 2 | 3 | CLASS |
|---|---|---|---|---|---|
| 3 | X | X | X | X | |
| 2 | X | O | O (Case of FIG.7) | X | |
| 1 | X | O | X | X | |
| 0 | O | O | O | X | |

…

ORTHOGONAL TRANSFORM ENCODER USING DC COMPONENT TO CONTROL QUANTIZATION STEP SIZE

BACKGROUND OF THE INVENTION

1. Field of the Invention

The present invention relates to an orthogonal transformation encoder for use in increasing a compression ratio in encoding a video signal with high efficiency 2. Description of the Prior Art Since a video signal has a vast amount of data, a high-efficiency coding method is adopted for recording or transmitting the data. The high-efficiency coding method employs a technique of reducing the amount of data keeping the possible high quality of the image while avoiding visually conspicuous deterioration of the image quality. In line with the above technique, there is an orthogonal transform coding system as an essence of a bandwidth compression coding.

In the orthogonal transform coding system, a screen image having a prescribed size is divided into a plurality of screen image blocks and the data of each screen image block is subjected to an orthogonal transform coding thereby to obtain orthogonal transform coefficients. Then the obtained orthogonal transform coefficients are quantized in such a manner that the method of the quantization is a decisive factor concerning the deterioration in quality of the resulting image.

For example, according to "Adaptive Coding of Monochrome and Color Images" by Chen and Smith, IEEE Transaction on Communications Vol. COM-25, No. 11, November, 1997, pp. 1285-1292, energy of alternating current components is calculated from orthogonal transform coefficients thereby to control the bit amount for assignment based on the calculated result.

However, according to the conventional coding method mentioned above, although the energy in each block of the screen image is reduced, the block which includes important data of such as a ground or water surface image fatally deteriorates. Furthermore, the calculation of energy of alternating current components requires a calculation of sum of squares, and therefore the above conventional coding method is not assumed to be the best one in terms of circuit scale.

SUMMARY OF THE INVENTION

Accordingly, an essential object of the present invention is to provide an orthogonal transformation encoder capable of achieving a well-balanced image quality throughout a screen by obtaining a degree of influence on visual sensation for each block of the screen image in a simple manner and assigning a greater amount of data to each block which includes visually important image data while assigning a smaller amount of data to each block in which deterioration of image quality is visually less conspicuous.

In order to achieve the object of the present invention with giving solution to the above-mentioned problems, the present invention provides an orthogonal transformation encoder which receives a video signal having sampled data divided in blocks as an input of the encoder and the encoder comprises:

an orthogonal transformation circuit for orthogonally transforming the input video signal divided in blocks;

a scanning circuit for rearranging transform coefficients obtained by the orthogonal transformation circuit;

a quantization control circuit for detecting a degree of influence on visual sensation of each block according to the transform coefficients concurrently with the operation of the scanning circuit to thereby generate a quantization control signal representing the degree of influence; and a coding circuit for quantizing and encoding the transform coefficients obtained by the scanning circuit according to the quantization control signal obtained by the quantization control circuit.

With the construction of the orthogonal transformation encoder according to the present invention, based on the degree of influence on the visual sensation in each block, a smaller amount of codes are assigned to each block in which image quality deterioration is less conspicuous while a greater amount of codes are assigned to each block in which image quality deterioration is conspicuous, thereby enabling to control the amount of codes with improvement of the image quality throughout the screen.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 2 (A) and 2 (B) are views showing coefficient arrangement patterns of each block for explaining the operation of the orthogonal transformation encoder of the embodiment according to the present invention;

FIGS. 5 (a) and 5 (b) are schematic views showing relationships between a luminance signal and a chrominance signal in the first embodiment of the present invention;

FIG. 8 is a view showing combinations in a detection pattern selection for explaining the operation of the quantization control circuit of the second embodiment of the present invention;

DETAILED DESCRIPTION OF THE PREFERRED EMBODIMENTS

The following describes preferred embodiments of the present invention with reference to the drawings.

Figure 1:
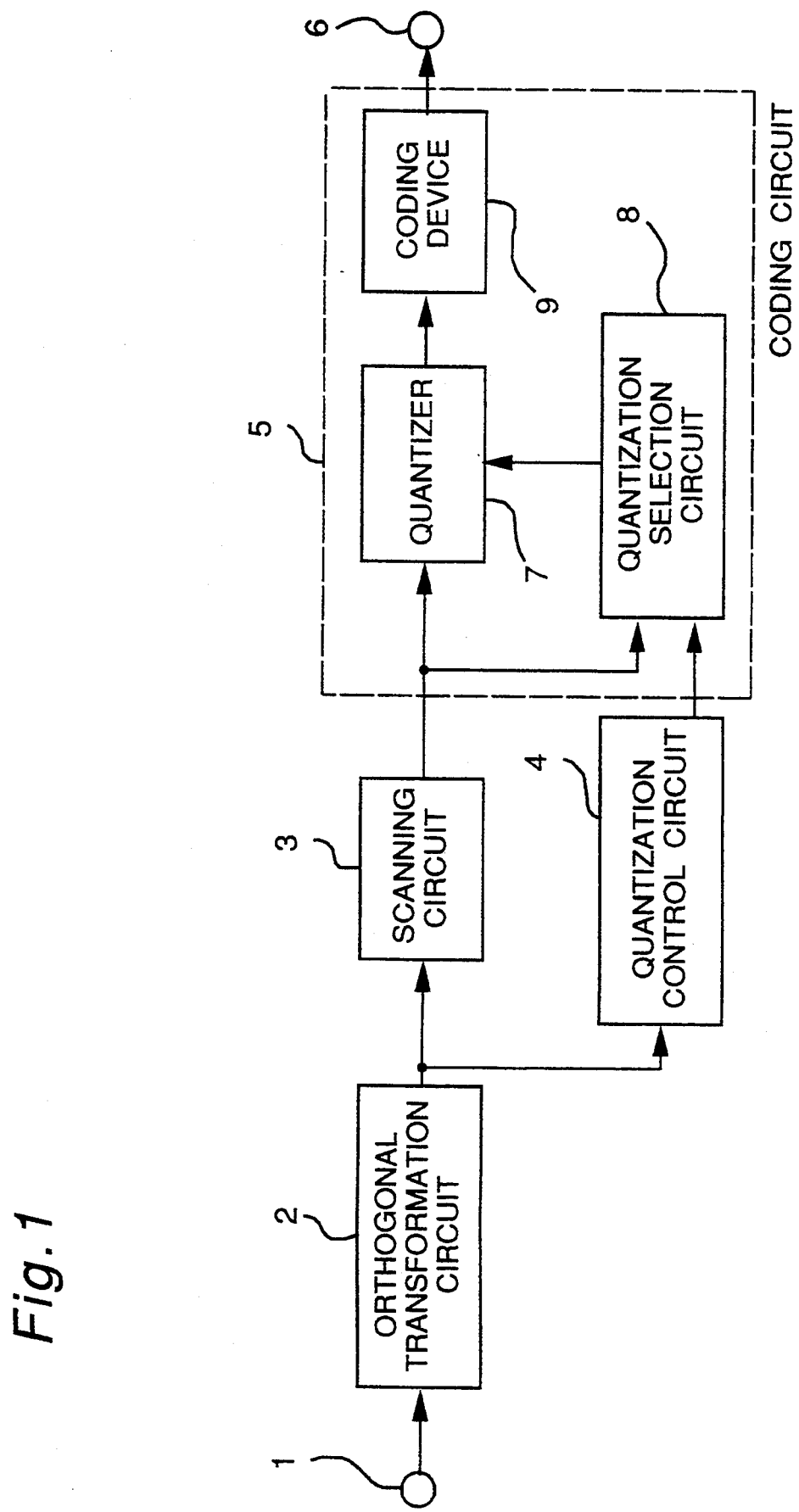
FIG. 1 is a block diagram showing an orthogonal transformation encoder in accordance with a first embodiment of the present invention.
Figure 3A:
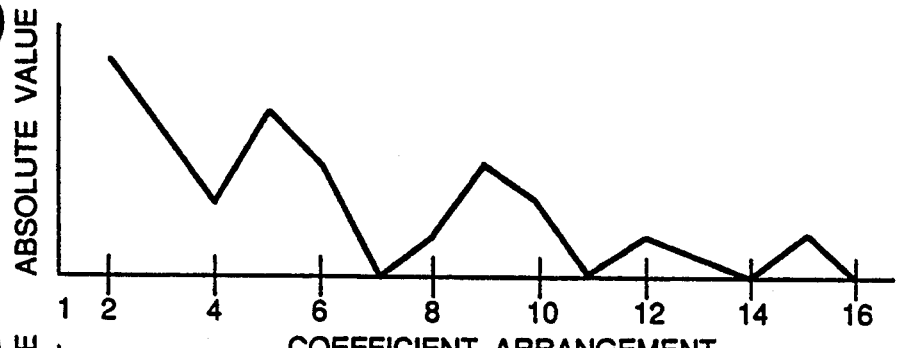
FIGS. 3 (a) through 3 (e) are graph views showing distribution patterns of absolute values of transform coefficients for explaining the operation of the orthogonal transformation encoder of the embodiment according to the present invention.
Figure 3B:
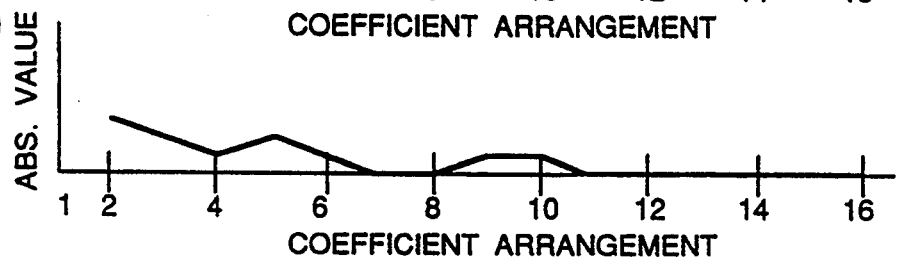
Figure 3C:
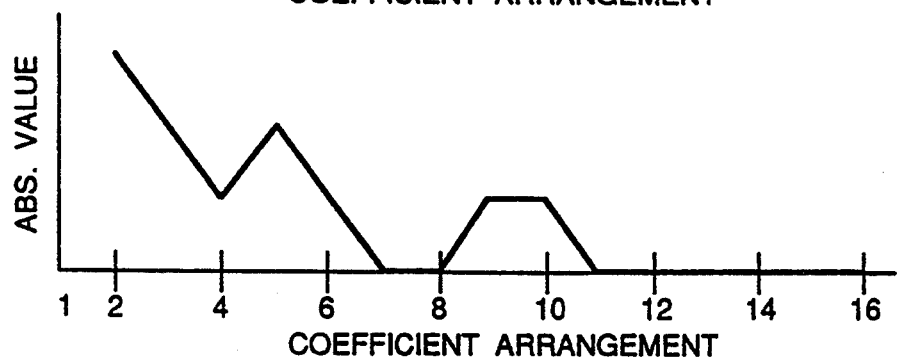
Figure 3D:
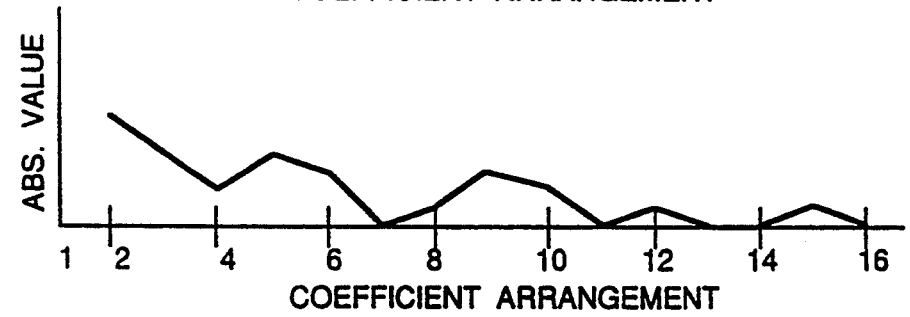
Figure 3E:
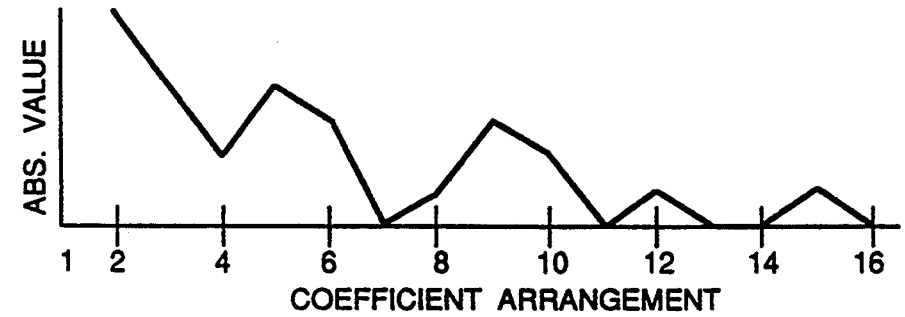

Referring to FIG. 1 which shows an orthogonal transformation encoder in accordance with a first embodiment, the orthogonal transformation encoder comprises an orthogonal transformation circuit 2 for orthogonally transforming an input video signal of sampled data divided in blocks received by an input terminal 1 to obtain orthogonal transform coefficients. The data of the orthogonal transform coefficients output from the orthogonal transformation circuit 2 is transmitted to both a scanning circuit 3 and a quantization control circuit 4. The scanning circuit 3 rearranges the transform coefficients obtained through the orthogonal transformation circuit 2 while the quantization control circuit 4 detects a degree of influence on the visual sensation for each block according to the transform coefficients transmitted from the orthogonal transformation circuit 2 thereby to generate a quantization control signal to be entered to a coding circuit 5. The rearranged transform coefficients output by the scanning circuit 3 are also transmitted to the coding circuit 5 where the rearranged transform coefficients are appropriately quantized and coded according to the quantization control signal transmitted from the quantization control circuit 4, and then the resulting coded data is outputted through an output terminal 6.

The coding circuit 5 comprises a quantization selection circuit 8 for specifying a quantization step size appropriate for dividing and compressing the orthogonal transform coefficients output from the scanning circuit 3 to a desired amount of coded bits according to the quantization control signal output from the quantization control circuit 4. The coding circuit 5 further comprises a quantizer 7 for quantizing the orthogonal transform coefficients rearranged by the scan circuit 3 with the quantization step size specified by the quantization selection circuit 8, and a coding device 9 for coding the quantized data output from the quantizer 7. The quantization selection circuit 8 is composed of a plurality of quantizing units having various quantization step sizes different from each other, and each quantizing unit quantizes the orthogonal transform coefficients. Among the resulting data therefrom, the appropriate quantization step size is specified for compressing the orthogonal transform coefficients to a desired data amount. In addition, since the quantization control signal output from the quantization control circuit 4 represents the degree of influence on the visual sensation in each block to be subjected to quantization, therefore the quantization step size for the block is appropriately controlled by the quantization selection circuit 8 according to the quantization control signal.

Figures 2A, 2B:
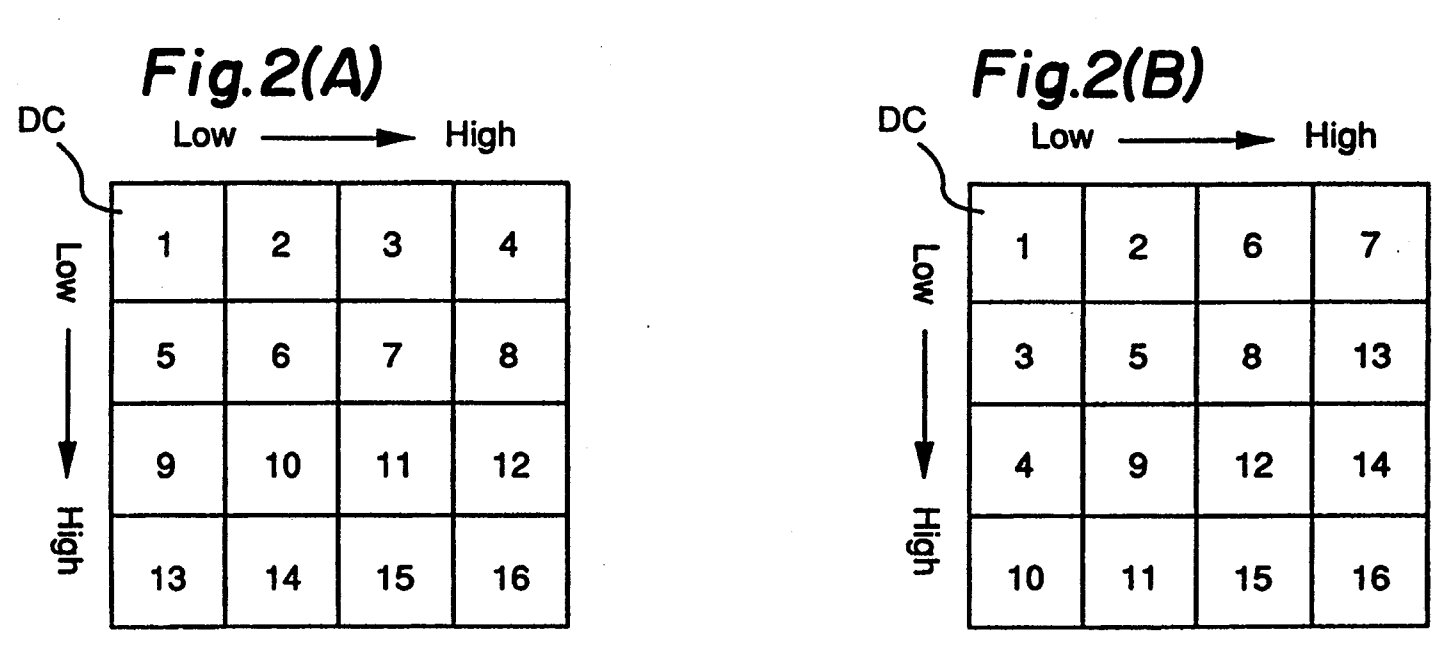

Referring to FIGS. 2 (A) and 2 (B) for explaining the operation of the scanning circuit 3, wherein FIG. 2 (A) shows an arrangement of the orthogonal transform coefficients output by the orthogonal transformation circuit 2 and FIG. 2 (B) shows an arrangement of the orthogonal transform coefficients rearranged by the scanning circuit 3.

It is now assumed that the operation of the orthogonal transformation circuit 2 is based on a two-dimensional orthogonal transformation and each block has a size of 4 horizontal pixels by 4 vertical pixels in each of the coefficient arrangements as shown in FIGS. 2 (A) and 2 (B). Therefore, in each of FIGS. 2 (A) and 2 (B), one block includes 16 coefficients composed of 4 horizontal coefficients by 4 vertical coefficients. In each of the blocks in FIGS. 2 (A) and 2 (B), the coefficients have such frequency correspondence that those located leftward correspond to a horizontal low-frequency part and those located upward correspond to a vertical low-frequency part. In the scanning circuit 3, the coefficients in each block are rearranged two-dimensionally in the order from the low frequency to the high frequency in so-called a zigzag scanning manner as shown in FIG. 2 (B) suitable for the coding operation in the two-dimensional orthogonal transformation. The above-mentioned rearrangement is adopted for the reason that the low-frequency components containing a direct current (DC) component exerts more influence on the visual sensation and therefore the low-frequency components are treated as more important components.

FIG. 3 (a) shows a distribution of orthogonal transform coefficients in a block to be input to the quantizer 7 from the scanning circuit 3, where the arrangement of the coefficients is composed of 16 coefficients corresponding to a block size of 4×4 pixels in the same manner as described in conjunction with FIG. 2 (B), wherein it is noted that the direct current (DC) component corresponding to number 1 of the coefficient arrangement is eliminated in FIG. 3 (a).

Now considering a case where the amplitude of a direct current (DC) component of the orthogonal transform coefficients output from the orthogonal transformation circuit 2 is greater than one prescribed threshold level (approximately corresponding to pure white) or smaller than the other prescribed threshold level (approximately corresponding to pure black), image quality deterioration exerts less influence on the visual sensation, and therefore a greater quantization step size is selected to quantize the transform coefficients with increment of the compression ratio in the quantizer 7. In this case, an example of the quantized coefficient distribution is shown in FIG. 3 (b).

FIG. 3 (c) shows a distribution of the coefficients when the coefficient distribution shown in FIG. 3 (b) is decoded, where the low-frequency part is reproduced while almost the entire high-frequency part is eliminated. This means that the data amount necessary for coding each block is reduced.

When the direct current (DC) component in the orthogonal transform coefficients is not in the above-mentioned condition, that is, in case where the amplitude of a direct current component of the orthogonal transform coefficients output from the orthogonal transformation circuit 2 is in a range between the prescribed upper and lower threshold levels, a quantization operation is carried out by selecting a smaller quantization step size without significantly increasing the compression ratio in the quantizer 7. As a consequence of the quantization, a coefficient distribution is obtained as shown in FIG. 3 (d), and the obtained coefficient distribution is decoded into a coefficient distribution as shown in FIG. 3 (e). Referring to FIG. 3 (e), the data amount increases in contrast to the coefficient distribution as shown in FIG. 3 (c). However, a reproducibility up to a high-frequency part is assured with less deterioration.

In other words, the quantization control circuit 4 judges the degree of influence on the visual sensation according to the amplitude of the direct current component of the orthogonal transform coefficients output from the orthogonal transformation circuit 2. The judgment result is output as a quantization control signal to the quantization selection circuit 8.

Figure 4:
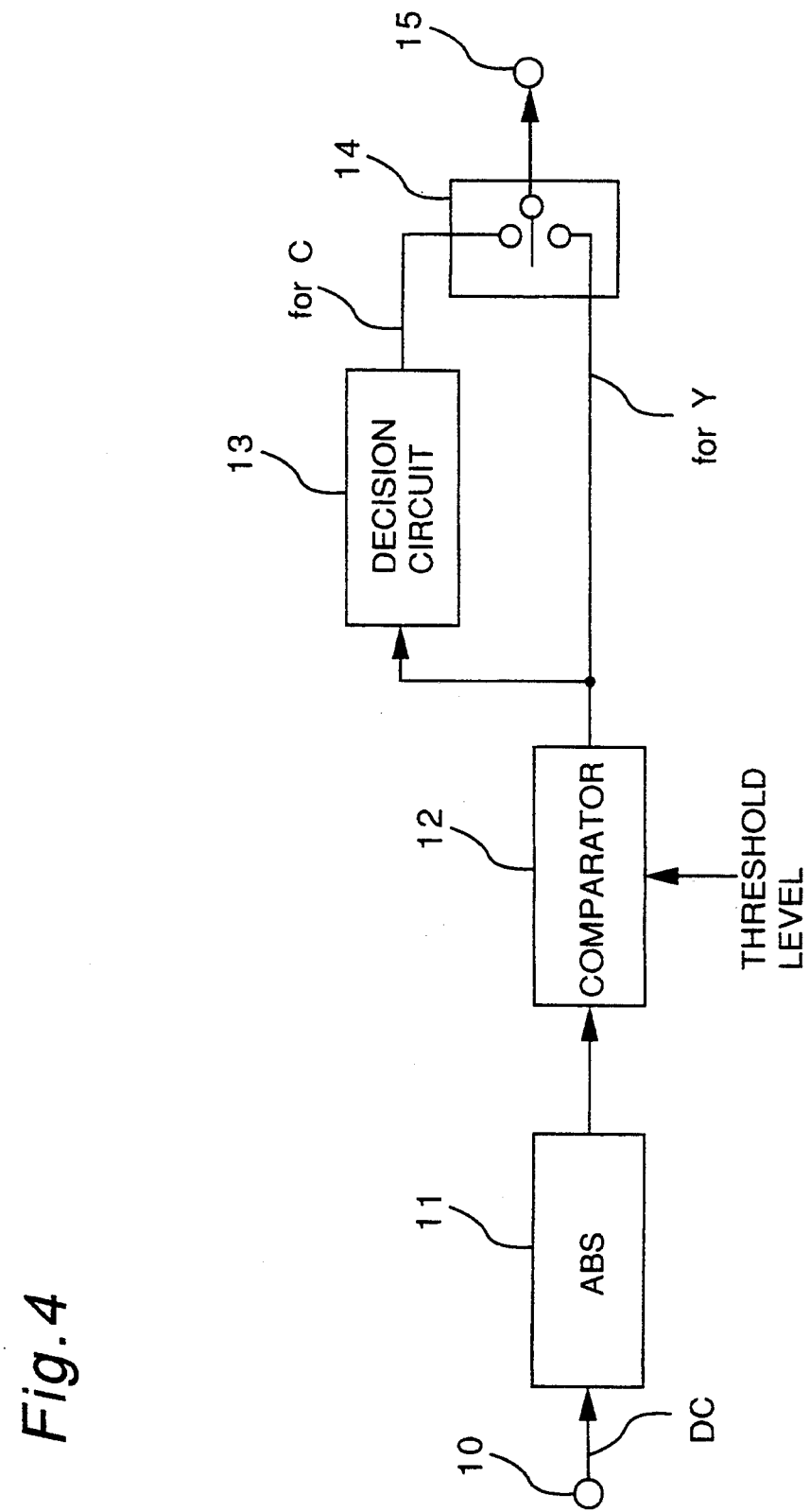
FIG. 4 is a block diagram showing a constitution of the quantization control circuit of the first embodiment of FIG. 1.
Figure 6:
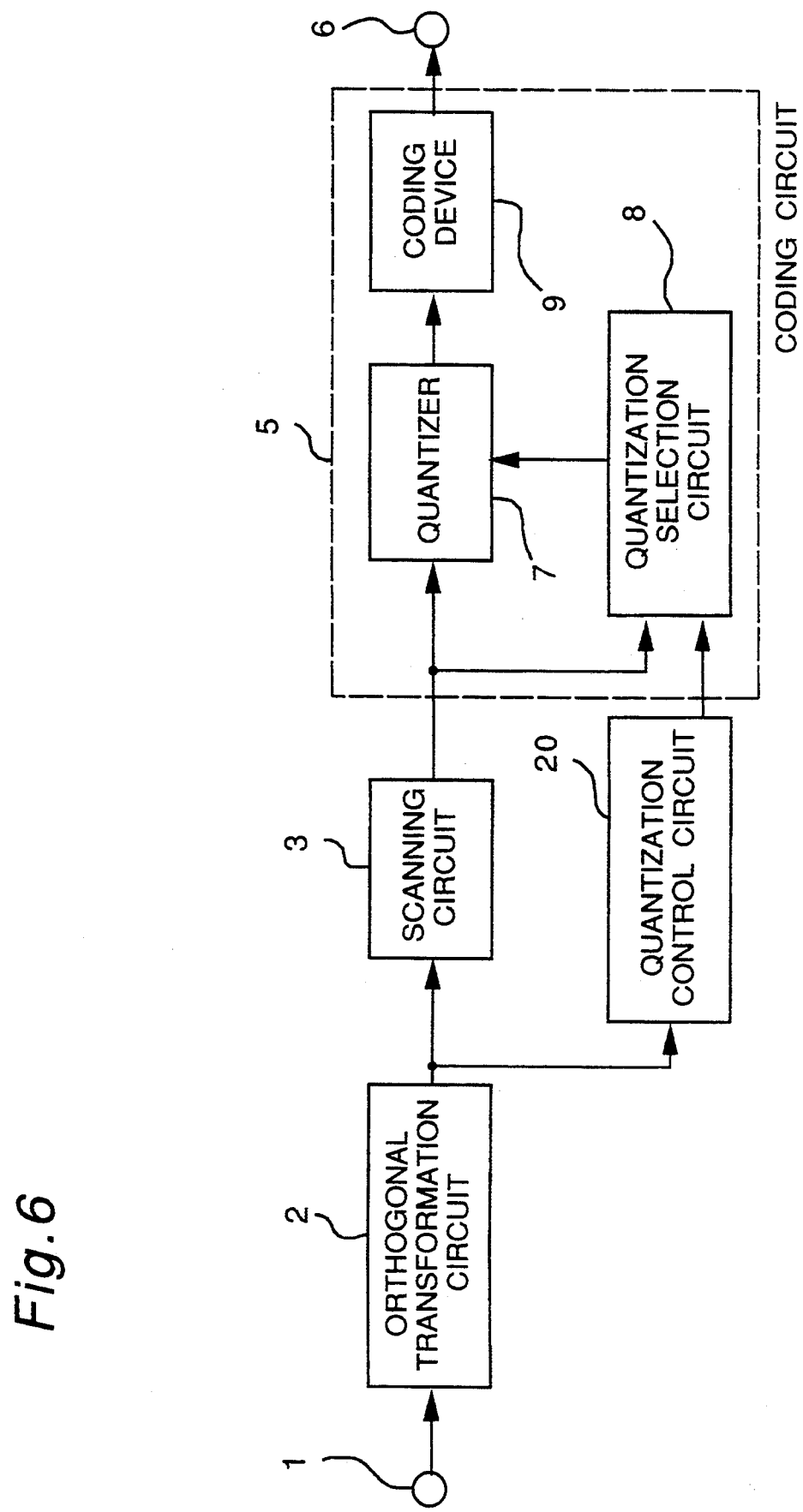
FIG. 6 is a block diagram showing an orthogonal transformation encoder in accordance with a second embodiment of the present invention.

FIG. 4 shows a constitution of the quantization control circuit 4 shown in FIG. 1. Referring to FIG. 4, the data of the orthogonal transform coefficients output from the orthogonal transformation circuit 2 is entered to a terminal 10, and the direct current (DC) component thereof is entered to an absolute circuit 11 where the amplitude value of the direct current is transformed to an absolute value. The absolute value is compared with the threshold level in a comparator unit 12 and the compared result is outputted as a binary quantization control signal through a terminal 15.

It is noted here that the direct current (DC) component of the orthogonal transform coefficients output from the orthogonal transformation circuit 2 is set in such a manner that the center of the luminance level (i.e., gray level) represents 0 (zero) level. For example, in case where the DC component is 9 bits, the value of the DC component is variable in a range from $-256$ to $+255$ (i.e., in a range from 0 to 256 in the absolute value thereof). Assuming that the threshold levels are set to $\pm 200$ in the 9-bit DC, when the amplitude of the DC component is below $-200$ or greater than $+200$, it is judged that the degree of influence on the visual sensation is less (or low).

Then the quantization selection circuit 8 specifies a quantization step size for compressing the orthogonal transformation coefficients output from the scanning circuit 3 in a unit of plural blocks to obtain a desired data amount for the unit of blocks. In the meantime, a relatively great quantization step size is applied to each block for which the quantization control signal represents a low degree of influence on the visual sensation and a smaller amount of coding bits are assigned, while a greater amount of coding bits are assigned to each block which represents a high degree of influence on the visual sensation in the plural blocks.

The quantization control circuit 4 outputs a control signal according to the amplitude of the direct current (DC) component for each luminance signal block. When an input block corresponds to a chrominance signal, the same control signal as applied to the luminance signal located at the same position as that of the chrominance block on the screen is adopted. For example, in the case of a 4:2:0 ratio signal obtained line-sequentially with the sampling frequency for the chrominance signal at one half of the sampling frequency for the luminance signal, the relation between the luminance signal block and The chrominance signal block is as shown in FIG. 5 (a) where one chrominance signal block corresponds to four luminance signal blocks. Therefore, when plural blocks among the blocks Y1, Y2, Y3, and Y4 as shown in FIG. 5 (a) satisfy the aforementioned condition, the chrominance signal block is quantized at a high compression ratio.

That is, referring back to FIG. 4, the binary output signal of the comparator 12 according to the luminance signal is temporarily stored in a decision circuit 13, and when the chrominance signal block is input, the output of the decision circuit 13 is generated as a quantization control signal through the terminal 15 by selecting a switch 14.

FIG. 5 (b) shows a 4:1:1 ratio signal obtained with the sampling frequency of the chrominance signal at one forth with respect to the sampling frequency of the luminance signal, where the signal is to be processed in the same manner as in the case in FIG. 5 (a).

According to the first embodiment as described above, in the quantization control circuit 4, the degree of influence on the visual sensation is judged with reference to the amplitude of each direct current component of the orthogonal transform coefficients thereby to detect the condition where the luminance signal has a great amplitude (approximately corresponding to pure white) as well as a small amplitude (approximately corresponding to pure black) where a low degree of influence is exerted on the visual sensation and image quality deterioration is less conspicuous. According to the above-mentioned detection operation, the quantization step size is controlled in the quantization selection circuit 8 to enable reducing the possible deterioration of image quality throughout the screen picture.

Although each chrominance signal block is controlled by means of the control signal for the corresponding luminance signal in the present embodiment, the luminance signal blocks may be only controlled without controlling any chrominance signal block to produce an effect of improving the image quality.

It is of course easy to process each chrominance signal block in the same manner as described in connection with the luminance signal blocks. In this case, the amplitude of a direct current component in each chrominance signal represents chroma. Therefore, it is preferred to judge the degree of influence on the visual sensation according to the amplitude of the direct current component of a block such as a red color block of which deterioration of image quality is conspicuous to thereby control the quantization step size of the block.

The following describes an orthogonal transformation encoder in accordance with a second embodiment of the present invention with reference to FIGS. 6 through 9. The second embodiment is similar to the first embodiment and like parts are designated by The same reference numerals except a different type of quantization control circuit 20 having its structure and operation different from those of the quantization control circuit 4 in the first embodiment.

The quantization control circuit 20 of the orthogonal transformation encoder detects distribution patterns each exerting a high or low degree of influence on the visual sensation among the entire distribution patterns of the orthogonal transform coefficients output from orthogonal transformation circuit 2 thereby to output a quantization control signal corresponding to the degree of influence on the visual sensation of each of the detected distribution pattern. The quantization selection circuit 8 controls the quantization step size for each block according to the degree of influence on the visual sensation represented by the quantization control signal in the same manner as described in connection with the first embodiment.

Figure 7:
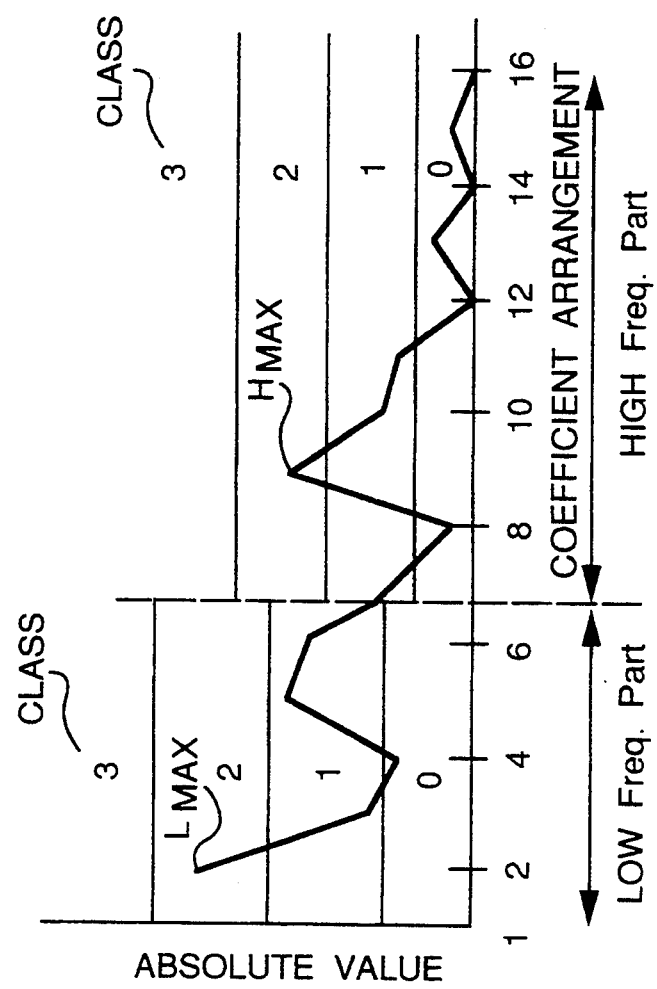
FIG. 7 is a graph view showing a distribution pattern of absolute values of transform coefficients for explaining the operation of a quantization control circuit of the second embodiment of the present invention.

The following describes the operation of the quantization control circuit 20 in the second embodiment with reference to FIG. 7. A distribution pattern of orthogonal transform coefficients as shown in FIG. 7 is divided into two parts, a low-frequency part and a high-frequency part, by using a specified coefficient arrangement as a boundary therebetween. Then the maximum values in the low-frequency and high-frequency parts are defined as $L_{max}$ and $H_{max}$ respectively. The two maximum values $L_{max}$ and $H_{max}$ are each classified into one of four classes of 0, 1, 2, and 3 in the ascending order according to their absolute values. The absolute values are subjected to judgment whether the arrangement pattern exerts a high degree of influence on the visual sensation according to a matrix of combinations of the classes as shown in FIG. 8.

The arrangement pattern combinations exerting a high degree of influence on the visual sensation are indicated by circle marks ○. According to the exemplified matrix shown in FIG. 8, a pattern including orthogonal transformation coefficients having small absolute values and a pattern where coefficients range from the low-frequency part to the high-frequency part are detected, while a pattern where coefficients are concentrated on the low-frequency part is not detected. Thus, the quantization is carried out in such a manner that the quantization step size is reduced for each detected pattern, while the quantization step size is increased for a pattern where orthogonal transform coefficients are concentrated on the low-frequency part and the coefficients have great amplitude values.

Figure 9:
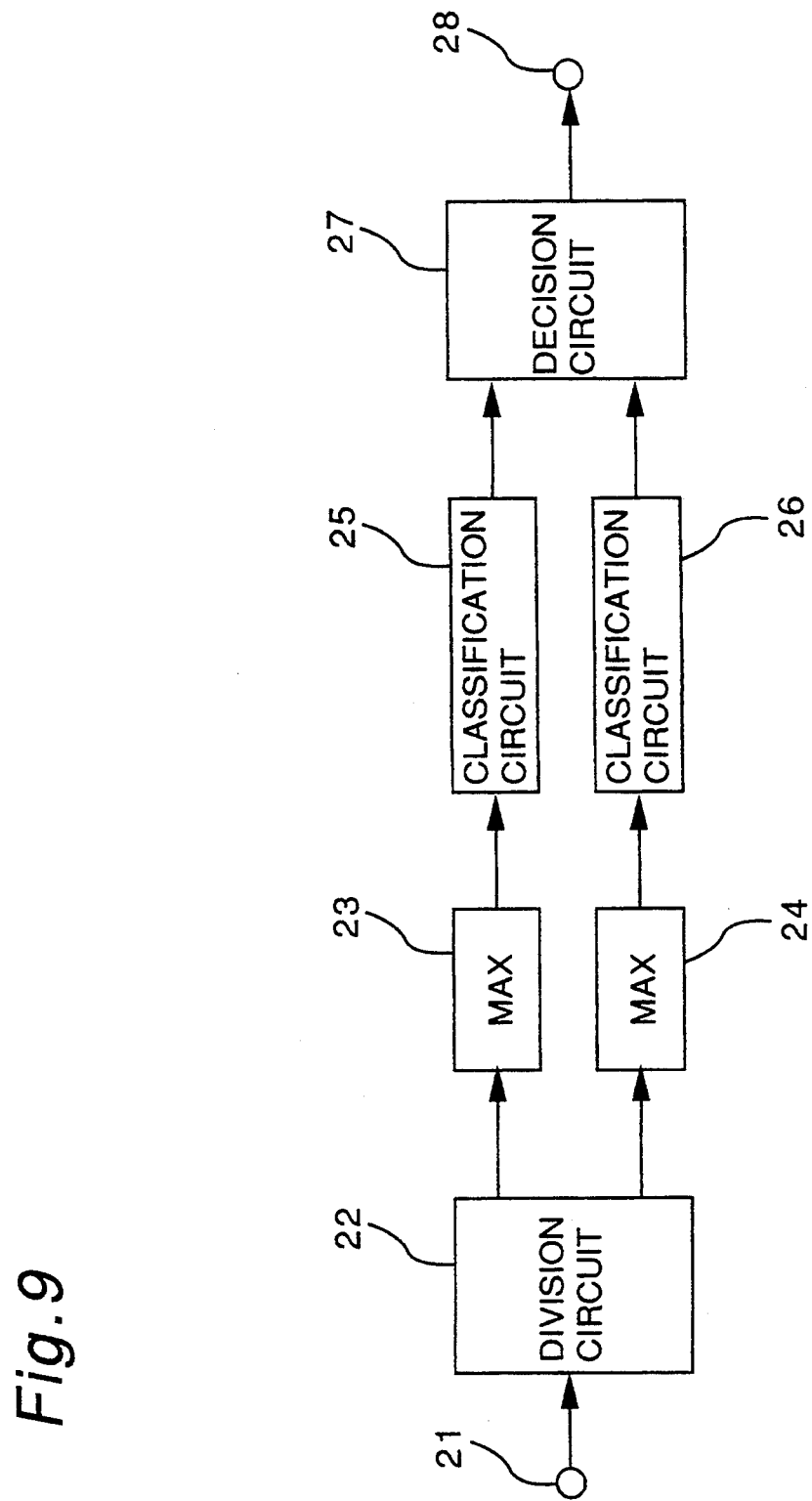
FIG. 9 is a block diagram showing a constitution of the quantization control circuit of the second embodiment of FIG. 6.

FIG. 9 shows an exemplified structure of the quantization control circuit 20. Referring to FIG. 9, the orthogonal transform coefficients output from the orthogonal transformation circuit 2 are entered to a division circuit 22 through a terminal 21 to be divided into two parts, low-frequency part and high-frequency part. The low and high frequency parts of the divided coefficients are respectively entered to MAX detection circuits 23 and 24 where the two maximum values $L_{max}$ and $H_{max}$ in the respective two blocks are detected. The two maximum values $L_{max}$ and $H_{max}$ are entered to classification circuits 25 and 26 respectively and classified according to the amplitude values thereof. The values of the classes output from the classification circuits 25 and 26 are judged in a decision circuit 27 using the matrix shown in FIG. 8 whether the combination of the classes is a pattern having a great degree of influence on the visual sensation. The judged results are generated as the control signal through a terminal 28 to be transmitted to the quantization selection circuit 8.

It is noted that the ratio of protecting the pattern detected according to the matrix, i.e., the control of the quantization step size can be determined for each detected pattern.

According to the second embodiment as described above, each distribution pattern of orthogonal transform coefficients of which deterioration is visually conspicuous is detected in the quantization control circuit 20, so that the quantization step size is controlled in the quantization selection circuit 8 according to the detected distribution pattern of the coefficients thereby to enable suppressing possible deterioration of the image quality.

As a pattern detection method of the quantization control circuit 20 of the present embodiment, the coefficients of the low-frequency part and the coefficients of the high-frequency part may be respectively added together to obtain sum values thereof so that the patterns to be detected can be defined based on the relation between the sum values.

Figure 10:
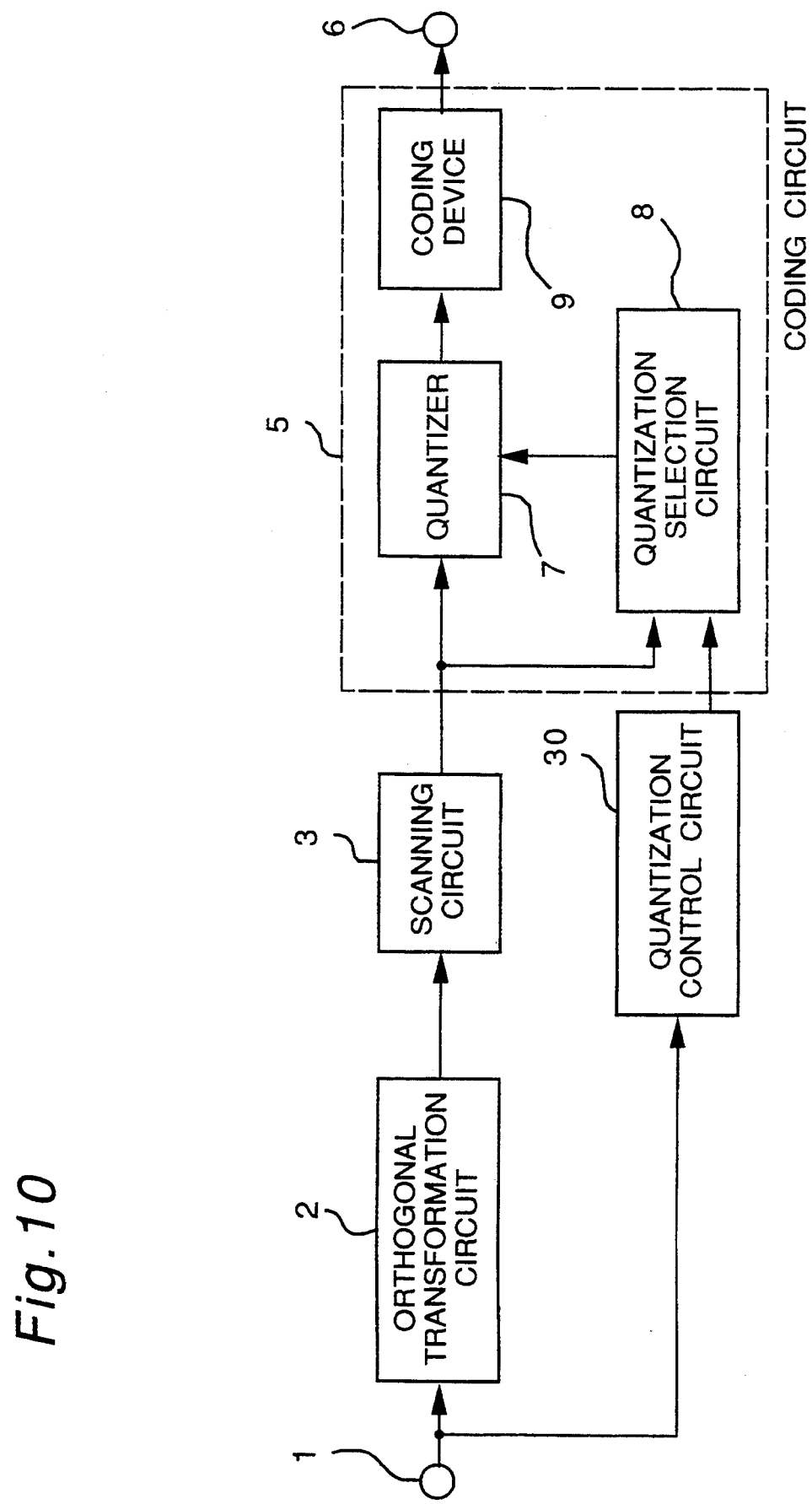
FIG. 10 is a block diagram showing an orthogonal transformation encoder in accordance with a third embodiment of the present invention.
Figure 11:
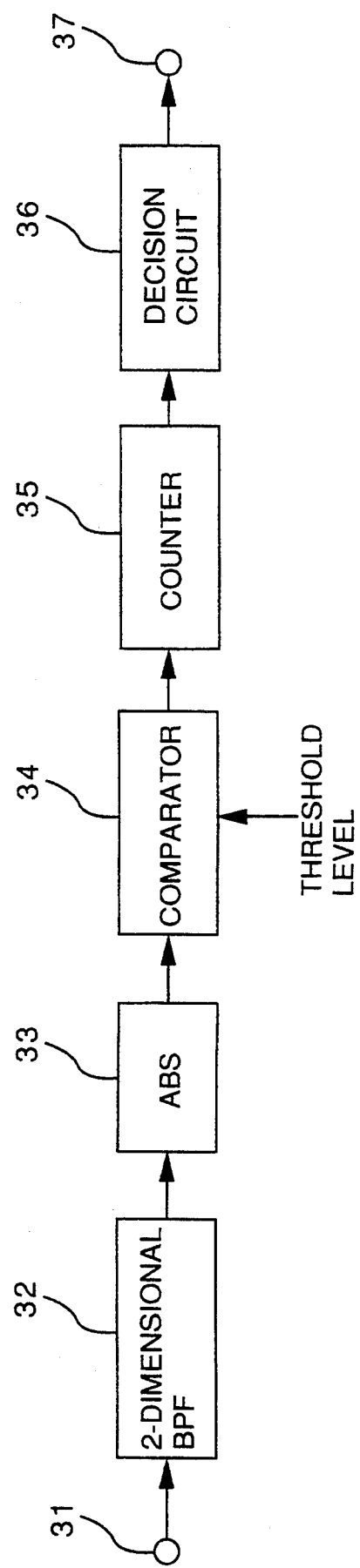
FIG. 11 is a block diagram showing a constitution of the quantization control circuit of the third embodiment of FIG. 10.

The following describes an orthogonal transformation encoder in accordance with a third embodiment of the present invention with reference to FIGS. 10 and 11. The third embodiment is similar to the first embodiment and like parts are designated by the same reference numerals throughout the drawings except an arrangement of a quantization control circuit 30 directly connected to a terminal 1 which is different from that of the quantization control circuit 4 employed in the first embodiment.

As shown in FIG. 10, the quantization control circuit 30 detects whether an edge exits in each block according to an amplitude pattern of each input block. It is noted here that an "edge" corresponds to a boundary or outline in the screen picture. When it is judged by the quantization control circuit 30 that an edge exists, the quantization step size is controlled by the quantization selection circuit 8. In more detail, when it is judged that an edge exists in a block, the quantization selection circuit 8 reduces the quantization step size in the same manner as described in connection with the first embodiment. For example, regular quantization by a compression ratio of one fourth is changed to quantization by a compression ratio of one half.

Describing the above operation with reference to FIG. 3, the distribution of the coefficient arrangement shown in FIG. 3 (d) is achieved instead of the distribution in FIG. 3 (b) which should have been achieved regularly. Therefore, the distribution of the coefficient arrangement in FIG. 3 (d) is decoded to obtain the distribution as shown in FIG. 3 (e), which means that orthogonal transform coefficients having less amount of errors than those shown in FIG. 3 (c) can be obtained to enable reducing the distortion in each block.

Referring to FIG. 11 showing an exemplified structure of the quantization control circuit 30, the amplitude values of each block are entered to a two-dimensional BPF (band-pass-filter) 32 through a terminal 31, and then the input amplitude values of the block are subjected to band-pass-filtration by calculating means using pixels in the vicinity thereof. The output amplitude values of the two-dimensional BPF 32 are entered to an absolute-value circuit 33 to obtain the absolute values of the amplitude. The absolute values are entered to a comparator 34 where the input absolute values are compared with a threshold level to carry out judgment whether each pixel contains a high-frequency component. The binary output data of the comparator 34 is entered to a counter 35 where the number (N) of the pixels containing a high-frequency component in each block is counted. The resulting counted values are entered to a decision circuit 36 for deciding whether the following condition is established:

$$0 < TH1 \leq X \leq TH2 < N$$

wherein X represents the counted value output by the counter 35, TH1 and TH2 represent threshold values, and N represents the number of the pixels in each block (N=16 in the embodiment).

When the above condition is satisfied, the output signal representing that an edge exists is generated through a terminal 37 to the quantization selection circuit 8. That is, the judgment that an edge exists is made when there exist high-frequency components in one block while the pixels containing the high-frequency components are not expanded in the entire part of the block.

According to the third embodiment as described above, by detecting an edge portion of which deterioration is conspicuous in the quantization control circuit 30 to control the quantization step size in the quantization selection circuit 8, the possible deterioration of image quality can be reduced.

Although each block to be orthogonally transformed has a size of 4×4 pixels in the aforementioned embodiments, each block may have a size of 8×8 pixels or 16×16 pixels. Furthermore, a three-dimensional orthogonal transformation may be adopted instead of the two-dimensional orthogonal transformation in the vertical and horizontal directions.

In the aforementioned embodiments, there have been described several ways of managing the degree of influence on the visual sensation and other factors independently on each embodiment. However, it is easy to integrate the methods of the embodiments to constitute one encoder structure. For the above purpose, it is preferred to adopt as a parameter a relative increase or decrease amount of a quantization step size.

Although the present invention has been fully described by way of examples with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. An orthogonal transformation encoder for encoding an input video signal of sampled data divided in blocks through orthogonal transformation and quantization for each block comprising:

orthogonal transformation means for orthogonally transforming the video signal divided in blocks to obtain orthogonal transform coefficients;

scanning means for rearranging the transform coefficients obtained by said orthogonal transformation means in a zigzag scanning manner for coding;

quantization control means for detecting a degree of influence on visual sensation for each block according to the amplitude value of the direct current component of the orthogonal transform coefficients obtained by said orthogonal transformation means concurrently with the rearrangement operation of said scanning means thereby to generate a binary control signal representing the detected degree of influence;

quantizing means for quantizing the transform coefficients rearranged by said scanning means with selection of a quantization step size for controlling the amount of codes according to the binary control signal generated by said quantization control means; and coding means for coding the transform coefficients quantized by said quantizing means.

2. The orthogonal transformation encoder as claimed in claim 1, wherein when the absolute value of the amplitude of the direct current component of the transform coefficients obtained by said orthogonal transformation means is greater than a prescribed value for each block, said quantization control means generates a quantization control signal representing a low degree of influence on the visual sensation and then said quantizing means selects an increased quantization step size greater than a regular size.

3. The orthogonal transformation encoder as claimed in claim 2, wherein said quantization control means outputs the control signal only when a block of the input video signal represents a luminance signal.

4. The orthogonal transformation encoder as claimed in claim 2, wherein when a block of the input video signal represents a chrominance signal, said quantization control means outputs the same control signal as applied to the luminance signal block of which location is identical to that of the chrominance signal block on a screen.

5. The orthogonal transformation encoder as claimed in claim 1, wherein said quantizing means specifies a reference quantization step size in a unit of a plurality of blocks, and a quantization step size for each block is relatively controlled in relation to the reference quantization step size according to the control signal output from said quantization control means.

* * * * *

UNITED STATES PATENT AND TRADEMARK OFFICE
CERTIFICATE OF CORRECTION

PATENT NO.    : 5,369,439
DATED         : November 29, 1994
INVENTOR(S)   : Matsuda et al.

It is certified that error appears in the above-identified patent and that said Letters Patent is hereby corrected as shown below:

On the title page, [56] Other Publications, add --W. Chen and C.H. Smith, "Adaptive Coding of Monochrome and Color Images", *IEEE Transactions on Communications*, Vol. COM-25, No. 11, PP. 1285-1292 (November, 1977)--.

Signed and Sealed this

Ninth Day of May, 1995

*Attest:*

BRUCE LEHMAN

*Attesting Officer*    *Commissioner of Patents and Trademarks*